(12) United States Patent
Nagasaki et al.

(10) Patent No.: US 8,200,412 B2
(45) Date of Patent: Jun. 12, 2012

(54) CONTROLLER FOR INTERNAL COMBUSTION ENGINE

(75) Inventors: Kenji Nagasaki, Nagoya (JP); Koji Wada, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 12/449,485

(22) PCT Filed: Apr. 6, 2007

(86) PCT No.: PCT/JP2007/057776
§ 371 (c)(1),
(2), (4) Date: Aug. 11, 2009

(87) PCT Pub. No.: WO2008/129608
PCT Pub. Date: Oct. 30, 2008

(65) Prior Publication Data
US 2010/0138136 A1 Jun. 3, 2010

(30) Foreign Application Priority Data
Apr. 4, 2006 (JP) .................................. 2006-103119

(51) Int. Cl.
*B60T 7/12* (2006.01)
*G05D 1/00* (2006.01)
*G06F 7/00* (2006.01)
*G06F 17/00* (2006.01)

(52) U.S. Cl. ..................... 701/103; 701/104; 701/107

(58) Field of Classification Search .................. 123/1 A, 123/304, 431, 575; 132/575–578; 702/182, 702/183, 185
See application file for complete search history.

(56) References Cited

U.S. PATENT DOCUMENTS

| 4,274,381 A | * | 6/1981 | Abo | 123/479 |
| 4,495,930 A | * | 1/1985 | Nakajima | 123/575 |
| 4,556,029 A | * | 12/1985 | Yamaguchi et al. | 123/41.15 |

(Continued)

FOREIGN PATENT DOCUMENTS

JP A-58-48737 3/1983

(Continued)

OTHER PUBLICATIONS

International Search Report for International Application No. PCT/JP2007/057776, Completed on Jun. 19, 2007, Japanese Patent Office.

*Primary Examiner* — Stephen K Cronin
*Assistant Examiner* — Sherman Manley
(74) *Attorney, Agent, or Firm* — Oliff & Berridge, PLC

(57) ABSTRACT

When a coolant temperature is abnormal and alcohol concentration of a main fuel detected by an alcohol concentration sensor is in a high concentration region, an auxiliary fuel supply is conducted. Thus, when the actual coolant temperature is in a low temperature region and an alcohol concentration of the main fuel is in a high concentration region, that is, when a volatility of the main fuel is not sufficient, the auxiliary fuel supply is certainly conducted. Furthermore, when the coolant temperature sensor is abnormal, the pseudo coolant temperature is set lower than the standard coolant temperature. A warming increase coefficient is computed by use of the pseudo coolant temperature. Thereby, the main fuel injection quantity is increased sufficiently when the actual coolant temperature is in a low temperature region and the alcohol concentration of the main fuel is in high concentration region.

10 Claims, 12 Drawing Sheets

U.S. PATENT DOCUMENTS

| | | | |
|---|---|---|---|
| 6,931,865 B1* | 8/2005 | Van Gilder et al. | 62/129 |
| 7,426,925 B2* | 9/2008 | Leone et al. | 123/575 |
| 2007/0289573 A1* | 12/2007 | Leone et al. | 123/305 |

FOREIGN PATENT DOCUMENTS

| | | |
|---|---|---|
| JP | A-61-76738 | 4/1986 |
| JP | A-63-230942 | 9/1988 |
| JP | B2-64-11811 | 2/1989 |
| JP | A-2-163451 | 6/1990 |
| JP | B2-4-15387 | 3/1992 |
| JP | A-5-71379 | 3/1993 |
| JP | A-5-71380 | 3/1993 |
| JP | B2-6-15840 | 3/1994 |
| JP | Y2-7-30927 | 7/1995 |
| JP | A-2004-339969 | 12/2004 |

* cited by examiner

| INTAKE AIR TEMPERATURE | -20°C | 0°C | 20°C | 30°C |
|---|---|---|---|---|
| AUXILIARY FUEL SUPPLY DETERMINATION VALUE E | 50% | 70% | 85% | 110% |

| INTAKE AIR TEMPERATURE \ ALCOHOL CONCENTRATION | 0% | 20% | 40% | 60% | 80% | 100% |
|---|---|---|---|---|---|---|
| -20°C | 80 | 80 | 80 | 60 | 35 | 35 |
| 0°C | 80 | 80 | 80 | 65 | 40 | 40 |
| 20°C | 80 | 80 | 80 | 70 | 55 | 55 |
| 40°C | 80 | 80 | 80 | 80 | 70 | 70 |

CONTROLLER FOR INTERNAL COMBUSTION ENGINE

CROSS-REFERENCE TO RELATED APPLICATION

This application is based on Japanese Patent Application No. 2006-103119 filed on Apr. 4, 2006, the disclosure of which is incorporated herein by reference.

TECHNICAL FIELD

The present invention relates to a controller for an internal combustion engine which can use fuel containing alcohol.

BACKGROUND ART

Alcohol, such as ethanol and methanol, or mixed fuel of alcohol and gasoline are used as a fuel for an internal combustion engine. Such an alcohol fuel containing alcohol has a lower volatility (combustibleness) than gasoline in low temperature. When the alcohol fuel is used, startability in low temperature and drivability after starting engine may be deteriorated.

As a countermeasure, JP-58-48737A shows a system in which an auxiliary fuel (for example, gasoline) supply apparatus is provided other than a main fuel supply apparatus which supplies an alcohol fuel as a main fuel. When the coolant temperature detected by the coolant temperature sensor is lower than a specified temperature, the auxiliary fuel of which volatility is high is supplied with the main fuel. As the alcohol concentration becomes high, the volatility becomes low. When the coolant temperature detected by the coolant temperature sensor is in low temperature region and the alcohol concentration of the main fuel detected by the alcohol concentration sensor is in high concentration region, the auxiliary fuel is supplied.

The stoichiometric air-fuel ratio of the alcohol fuel is smaller than the stoichiometric air-fuel ration of the gasoline (14.7). For example, the alcohol fuel contains ethanol 100%, the stoichiometric air-fuel ration is 8.9. In a case that the alcohol fuel is used, if the fuel injection control is conducted in the same condition as the gasoline, the fuel injection quantity is excessively increased, so that the exhaust emission and drivability are deteriorated.

As a countermeasure, JP-64-11811B shows the fuel injection quantity is increased by correction according to the alcohol concentration detected by the alcohol concentration sensor. Further, the fuel injection quantity is increased based on the coolant temperature detected by the coolant temperature sensor and the alcohol concentration detected by the alcohol concentration sensor according to a fact that the volatility of the alcohol fuel becomes lower when it is low temperature.

In the auxiliary fuel supply control, if a standard coolant temperature (for example 80° C.) is used as a substitute information of the coolant temperature as a fail-safe for malfunction of a coolant temperature sensor, when the actual coolant temperature is in low temperature region and the alcohol concentration is in high concentration region, the standard coolant temperature is not in the lower temperature region. Thus, the auxiliary fuel supply is not conducted, and the startability and drivability may be deteriorated.

In a fuel injection control, if a standard coolant temperature (for example 80° C.) is used as a substitute information of the coolant temperature, when the actual coolant temperature is in a low temperature region and the alcohol concentration is in high concentration region, an increase coefficient of the fuel injection quantity is established by use of the standard coolant temperature. The fuel increase correction amount is increased and the startability and the drivability may be deteriorated.

DISCLOSURE OF THE INVENTION

The present invention is made in view of the above matters, and it is an object of the present invention to provide a controller for an internal combustion engine which improves startability and drivability when a coolant temperature sensor is abnormal in a system where a fuel containing alcohol can be used.

According to a first aspect of the present invention, a controller for an internal combustion engine can be applied to a system in which a main fuel including alcohol and an auxiliary fuel of which volatility is higher than the main fuel can be supplied. The controller controls an auxiliary fuel supply based on a coolant temperature detected by a coolant temperature sensor and alcohol concentration detected or estimated by an alcohol concentration obtaining means. In a case that the coolant temperature sensor is abnormal, when the alcohol concentration of the main fuel is greater than a specified auxiliary fuel supply determination value, the auxiliary fuel supply is conducted.

When the coolant temperature sensor is abnormal and the alcohol concentration of the main fuel is greater than or equal to the auxiliary fuel supply determination value, the auxiliary fuel supply is conducted in all temperature regions from a low temperature region to a high temperature region. Thereby, when the actual coolant temperature is in the low temperature region and the alcohol concentration of the main fuel is in the high concentration region, that is, when a volatility of the main fuel is not sufficient, an auxiliary fuel supply can be certainly conducted. Startability and drivability can be improved. When the alcohol concentration of the main fuel is lower than the auxiliary fuel supply determination, value, it is determined that the volatility of the main fuel is ensured. The auxiliary fuel supply is not conducted, so that an excess use of auxiliary fuel is restricted.

According to a second aspect of the present invention, when the coolant temperature sensor is abnormal, the internal combustion engine is inoperative, and the alcohol concentration of the main fuel is greater than or equal to the auxiliary fuel supply determination value, the auxiliary fuel supply is conducted. Thus, when the coolant temperature is abnormal, the internal combustion engine is inoperative; and the alcohol concentration of the main fuel is greater than or equal to the auxiliary fuel supply determination value, the auxiliary fuel supply is conducted. When the engine is operative, even if the alcohol concentration of the main fuel is greater than or equal to the auxiliary fuel supply determination value, the auxiliary fuel supply is not conducted, so that an excess use of auxiliary fuel is restricted.

According to a third aspect of the present invention, the auxiliary fuel supply determination value may be varied according to at least one of the intake air temperature and fuel temperature of the engine. That is, the auxiliary fuel supply determination value is varied according to the intake air temperature and fuel temperature of the engine. The auxiliary fuel supply determination value can be suitably varied when the alcohol concentration is varied.

Furthermore, the coolant temperature right before the previous engine stop and an engine stop period from the previous stop to the current start are temperature information of the internal combustion engine. According to a fourth aspect of the present invention, the auxiliary fuel supply determination value can be varied according to the coolant temperature right before the previous engine stop and an engine stop period from the previous stop to the current start. The auxiliary fuel supply determination value can be suitably varied when the alcohol concentration is varied.

According to a fifth aspect of the present invention, the controller controls a fuel injection quantity of the main fuel based on a coolant temperature detected by a coolant temperature sensor and an alcohol concentration detected or estimated by an alcohol concentration obtaining means. When the coolant temperature sensor is abnormal, a pseudo coolant temperature is set to a temperature lower than a standard coolant temperature. The fuel injection quantity of the main fuel can be controlled by used of the pseudo coolant temperature as substitute information of the coolant temperature.

Thereby, when the coolant temperature sensor is abnormal, the actual coolant temperature is in a low temperature region, and the alcohol concentration is in high concentration region, the increase coefficient of the main fuel injection quantity can be set by use of the pseudo coolant temperature which is lower than the standard coolant temperature. The main fuel injection quantity can be increased sufficiently. The startability and the drivability can be improved. A start region is enlarged.

According to a sixth aspect of the present invention, the pseudo coolant temperature may be set in a manner that the pseudo coolant temperature is decreased as the alcohol concentration becomes higher. The pseudo coolant temperature is decreased so that the main fuel is corrected to be increased.

The coolant temperature, the intake air temperature, and the fuel temperature are varied according to the engine temperature. Thus, the intake air temperature and the fuel temperature are information of the coolant temperature. According to a seventh aspect of the present invention, the pseudo coolant temperature may be corrected according to at least one of the intake temperature and fuel temperature. That is, the pseudo coolant temperature is corrected according to the intake air temperature and the fuel temperature. An error between the pseudo coolant temperature and the actual coolant temperature becomes small. The setting accuracy of the pseudo coolant temperature can be improved.

According to the eighth aspect of the present invention, the pseudo coolant temperature can be corrected according to the coolant temperature right before the previous engine stop and an engine stop time from the previous stop to the current start. An error between the pseudo coolant temperature and the actual coolant temperature becomes small. The setting accuracy of the pseudo coolant temperature can be improved.

According to a ninth aspect of the present invention, the pseudo coolant temperature can be set in a manner as to close, to the standard coolant temperature. The pseudo coolant temperature can be varied in the same manner as the actual coolant temperature. The setting accuracy of the pseudo coolant temperature can be improved.

According to the tenth aspect of the present invention, when the output of exhaust gas sensor becomes rich, the pseudo coolant temperature comes close to the standard coolant temperature in a high speed. When the output of the exhaust gas sensor becomes rich, the engine temperature is increased. The volatility of the fuel becomes high and the air-fuel ration becomes rich. When the output of the exhaust gas sensor becomes rich, the engine temperature is increased and the actual coolant temperature is increased. The pseudo coolant temperature comes close to the standard coolant temperature in a high speed. The air-fuel ratio controllability is improved.

According to the eleventh aspect of the present invention, the pseudo coolant temperature is set to a standard coolant temperature or high temperature side when the coolant temperature sensor becomes abnormal during the air-fuel ratio feedback control. The air-fuel ratio feedback control is started after the coolant temperature is increased. When the coolant temperature sensor becomes abnormal during the air-fuel ratio feedback control, the pseudo coolant temperature is set to the standard coolant temperature. Alternatively, the pseudo coolant temperature is set to high temperature side. Thus, the pseudo coolant temperature comes close to the actual coolant temperature. The setting accuracy of the pseudo coolant temperature can be improved.

BRIEF DESCRIPTION OF THE DRAWINGS

Other objects, features and advantages of the present invention will become more apparent from the following description made with reference to the accompanying drawings.

BEST MODES FOR CARRYING OUT THE INVENTION

Best modes for carrying out the present invention will be described hereinafter.

First Embodiment

Figure 1:
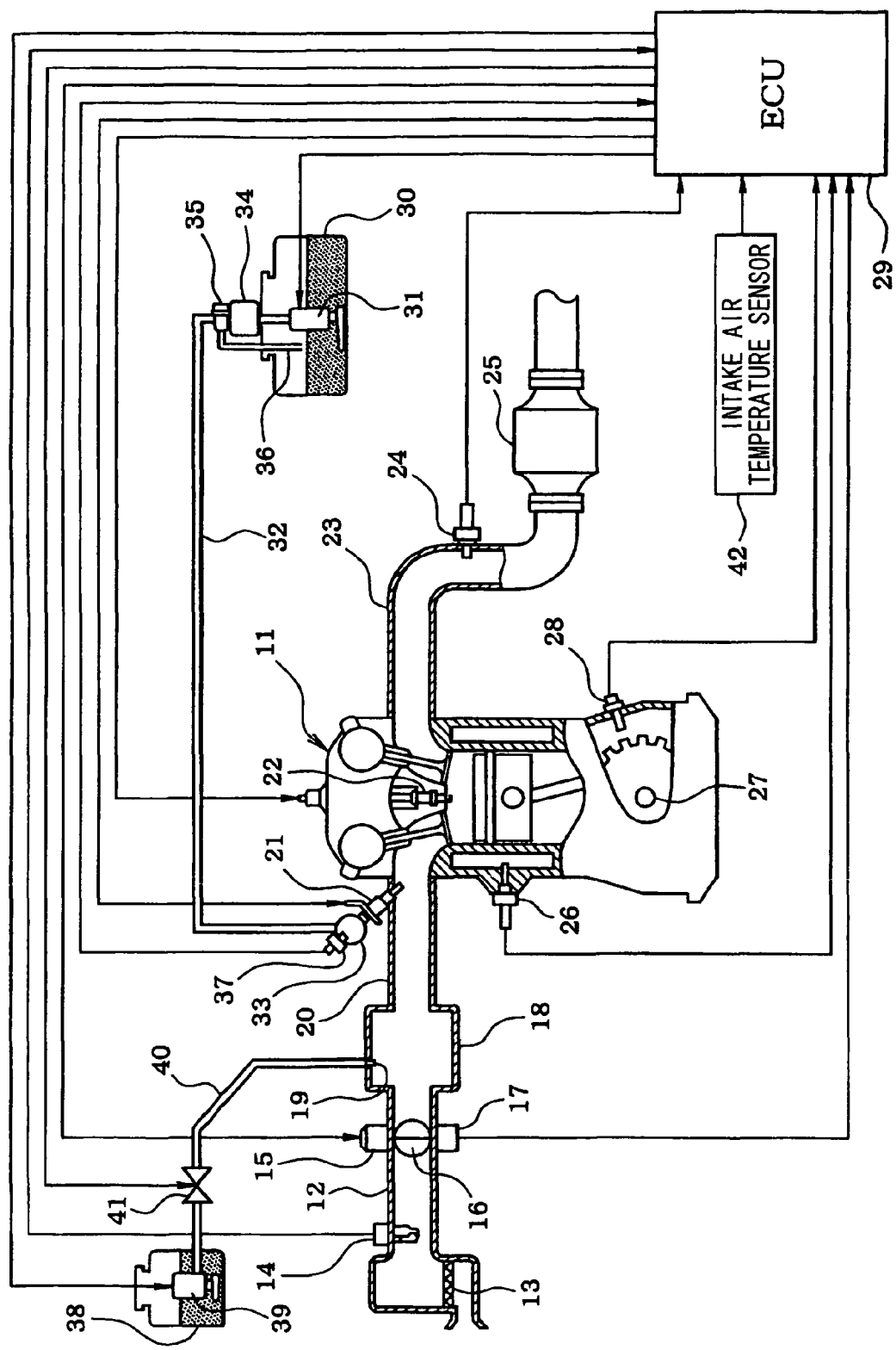
FIG. 1 is a schematic view of an engine control system according to a first embodiment of the present invention.

Referring to FIGS. 1 to 14, a first embodiment of the present invention will be described. First, referring to FIG. 1, a schematic configuration of an engine control system will be described. An air cleaner 13 is provided upstream portion of an intake pipe 12 of an internal combustion engine 11. An airflow meter 14 detecting an intake air quantity is provided downstream of the air cleaner 13. A throttle valve 16 driven by a motor 15 and a throttle position sensor 17 detecting a position of the throttle valve 16 (throttle opening) are provided downstream of the airflow meter 14.

A surge tank 18 is provided downstream of the throttle valve 16. The surge tank 18 is provided with an injection nozzle 19 injecting an auxiliary fuel. The surge tank 18 is connected to an intake manifold 20 introducing intake air into each cylinder. A fuel injector 21 injecting a main fuel is provided at a vicinity of an intake port of the intake manifold 20. A spark plug 22 is mounted on a cylinder head for each cylinder. By a spark of the spark plug 22, a fuel mixture in the cylinder is ignited.

An exhaust pipe 23 of the engine 11 is provided with an exhaust gas sensor 24 (air-fuel ratio sensor, oxygen sensor and the like) which detects air-fuel ratio or rich/lean of the exhaust gas. A three-way catalyst 25 purifying the exhaust gas is provided downstream of the exhaust gas sensor 24.

A coolant temperature sensor 26 detecting coolant temperature and a crank angle sensor 28 outputting a pulse signal every when the crank shaft 27 rotates a specified crank angel are provided on a cylinder block of the engine 11. Based on the output signal of the crank angle sensor 28, a crank angle and an engine speed are detected. An intake air temperature sensor 24 detects intake air temperature.

Alcohol, such as ethanol and methanol, or mixture fuel of alcohol and gasoline can be used as fuel of the engine 11. The alcohol fuel including alcohol is supplied to the engine 11 as a main fuel. Mixture fuel or gasoline which has higher volatility than the main fuel is supplied to the engine 11 as auxiliary fuel. A main fuel pump 31 pumping up the main fuel is provided in a main fuel tank 30 storing the main fuel therein. The main fuel discharged from the main fuel pump 31 is introduced into a delivery pipe 33 through a fuel pipe 32. From the delivery pipe 33, the main fuel is distributed into the fuel injector 21 of each cylinder. A filter 34 and a pressure regulator 35 are connected to the fuel pipe 32 at a vicinity of the main fuel pump 31. A discharge pressure of the main fuel pump 31 is regulated to a specified pressure by the pressure regulator 35. An excess fuel is returned to the main fuel tank 30 through a fuel return pipe 36.

The delivery pipe 33 is provided with an alcohol concentration sensor 37 (alcohol concentration obtaining means) which detects alcohol concentration (for example, ethanol concentration) of the main fuel. The alcohol concentration sensor 37 is provided with a fuel temperature sensor detecting a fuel temperature. Besides, the alcohol concentration sensor 37 and fuel temperature sensor may be disposed separately.

In a sub-fuel tank 38 storing the auxiliary fuel, a sub-fuel pump 39 pumping up the auxiliary fuel is disposed. The auxiliary fuel discharged from the sub-fuel pump 39 flows through a fuel pipe 40 and is injected from the injection nozzle 19. The fuel pipe 40 is provided with a duty control valve 41. By controlling the opening degree of the duty control valve 41, the auxiliary fuel quantity at the injection nozzle 19 is adjusted.

Outputs of various sensors are inputted into a control circuit (ECU) 29. The ECU 29 includes a microcomputer. The ECU 29 executes various engine control program stored in a ROM (memory media), whereby main fuel injection quantity by the fuel injector 21, the auxiliary fuel injection quantity by the injection nozzle 19, and ignition timing of the spark plug 22 are controlled according to an engine driving condition.

Figure 2:
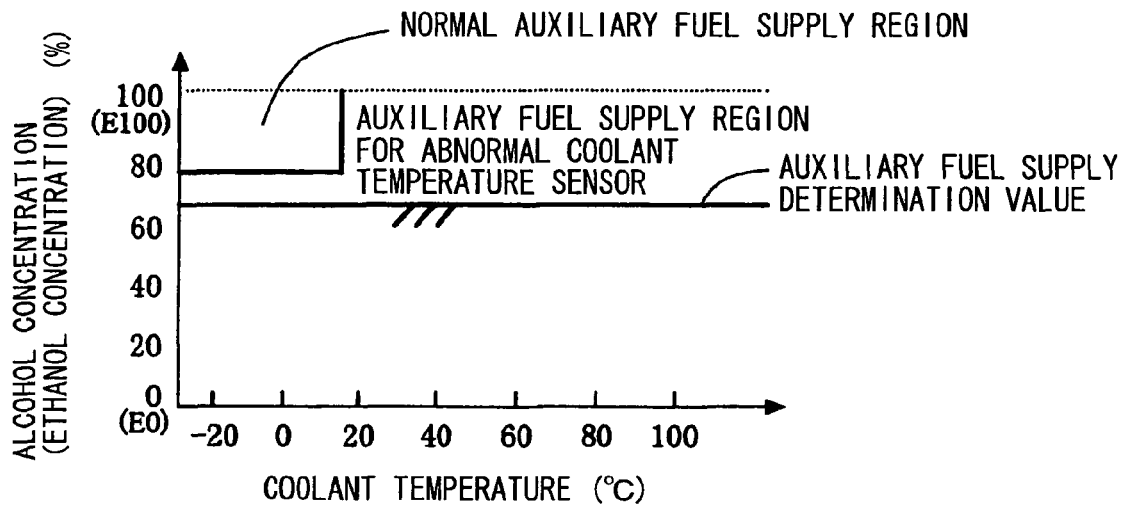
FIG. 2 is a chart showing an auxiliary fuel supply region according to the first embodiment.
Figure 13:
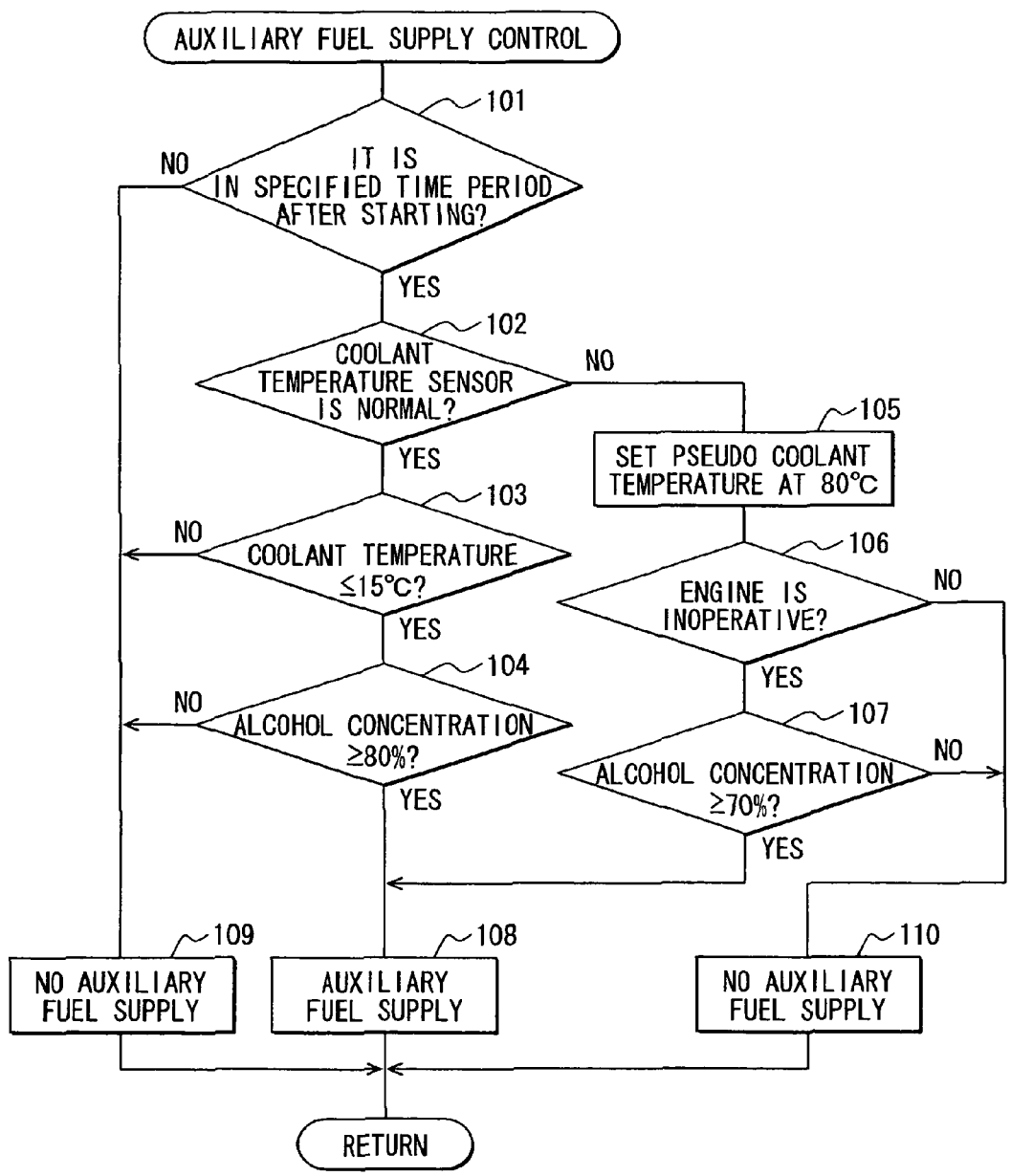
FIG. 13 is a flowchart showing an auxiliary fuel supply control program according to the first embodiment.

The ECU 29 executes an auxiliary fuel supply control program shown in FIG. 13 to control an auxiliary fuel supply. When the coolant temperature sensor 26 is normal in a specified period from starting, it is determined whether the coolant temperature detected by the coolant temperature sensor 26 and alcohol concentration (for example, ethanol concentration) detected by the alcohol concentration sensor 37 are in a normal auxiliary fuel supply region. As shown in FIG. 2, the normal auxiliary fuel supply region is a region where the coolant temperature is less than or equal to a specified temperature (for example, 15° C.) and alcohol concentration of the main fuel is greater than or equal to a specified concentration (for example, 80%). The normal auxiliary fuel supply region is a region where the volatility (combustibleness) of the main fuel is not ensured sufficiently.

When the coolant temperature and alcohol concentration of the main fuel is in the normal auxiliary fuel supply region, it is determined that enough volatility of the main fuel is not ensured. The auxiliary fuel of which volatility is higher than the main fuel is supplied. When the coolant temperature and alcohol concentration of the main fuel is out of the normal auxiliary fuel supply region, it is determined that enough volatility of the main fuel is ensured. Thus, the auxiliary fuel is not supplied.

When the coolant temperature sensor 26 is abnormal in a specified period from starting, it is determined whether the alcohol concentration of the main fuel is in the auxiliary fuel supply region for abnormal coolant temperature sensor. As shown in FIG. 2, the auxiliary fuel supply region for abnormal coolant temperature sensor is a region where the alcohol concentration of the main fuel is higher than a specified auxiliary fuel supply determination value (for example, 70%). The auxiliary fuel supply region for abnormal coolant temperature sensor includes the normal auxiliary fuel supply region.

When the alcohol concentration of the main fuel is in the auxiliary fuel supply region for abnormal coolant temperature sensor, it is determined that the volatility of the main fuel can not be ensured. The auxiliary fuel of which volatility is higher than the main fuel is supplied. When the alcohol concentration of the main fuel is out of the auxiliary fuel supply region for abnormal coolant temperature sensor, it is determined that the volatility of the main fuel can be ensured. The auxiliary fuel is not supplied.

The ECU 29 executes a fuel injection control program and functions as fuel injection control means. The ECU 29 multiplies the basic fuel injection quantity by warming increase coefficient, an air-fuel ratio feedback correction value, an air-fuel ratio learning value, and an alcohol concentration correction value to obtain a main fuel injection quantity.

Main fuel injection quantity=Basic fuel injection quantity×Warming increase coefficient×Air-fuel ratio feedback correction value×Air-fuel ratio learning value×Alcohol concentration correction value The basic fuel injection quantity is computed according to the engine driving condition (for example, engine speed, intake air quantity) by use of a map. The air-fuel ratio feedback correction value is derived by PID control in which air-fuel ratio of the exhaust gas agrees with the target air-fuel ratio. The air-fuel ratio learning value is obtained by learning the air-fuel ratio feedback correction value in a specified learning timing.

Figure 3:
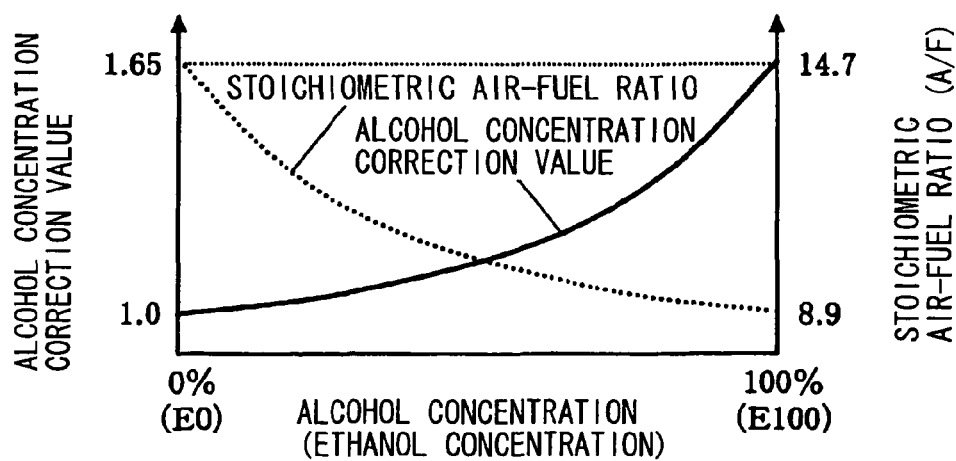
FIG. 3 is a chart conceptually showing a map of an alcohol concentration correction.

The alcohol concentration correction value is computed based on the alcohol concentration of the main fuel referring to an alcohol concentration correction value map shown in FIG. 3. Generally, as the alcohol concentration of the main fuel becomes higher, the stoichiometric air fuel ratio becomes smaller. In the alcohol concentration correction value map shown in FIG. 3, as the alcohol concentration of the main fuel becomes higher, the alcohol concentration correction value becomes larger so that the main fuel injection quantity is increased.

Figure 4:
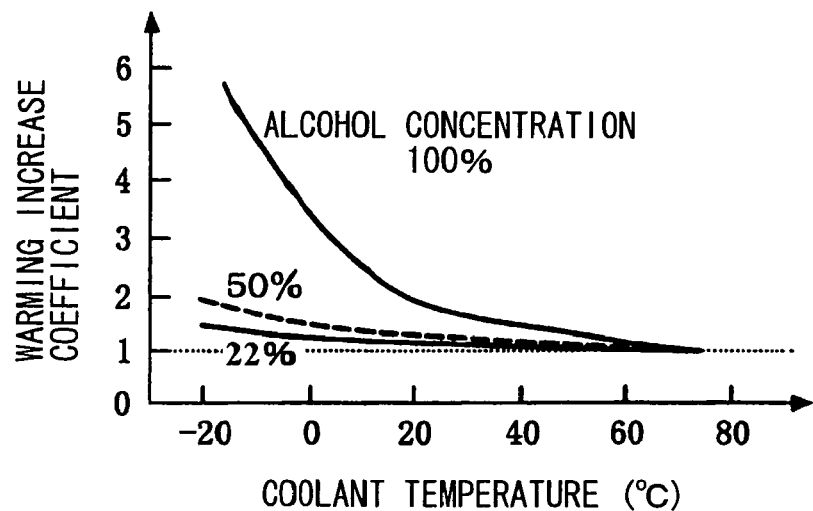
FIG. 4 is a chart conceptually showing a map of a warming increase coefficient.

The warming increase coefficient is computed based on the coolant temperature and alcohol concentration referring to a warming increase coefficient map shown in FIG. 4. Generally, as the coolant temperature decreases, the volatility of the main fuel becomes lower. As the alcohol concentration of the main fuel becomes higher, the volatility of the main fuel becomes lower. In the warming increase coefficient map shown in FIG. 4, as the coolant temperature decrease, the warming increase coefficient becomes larger so that the main fuel injection quantity is increased. Besides, when the coolant temperature sensor 26 is abnormal, the warming increase coefficient is computed by use of pseudo coolant temperature as substitute information of the coolant temperature.

Figure 14:
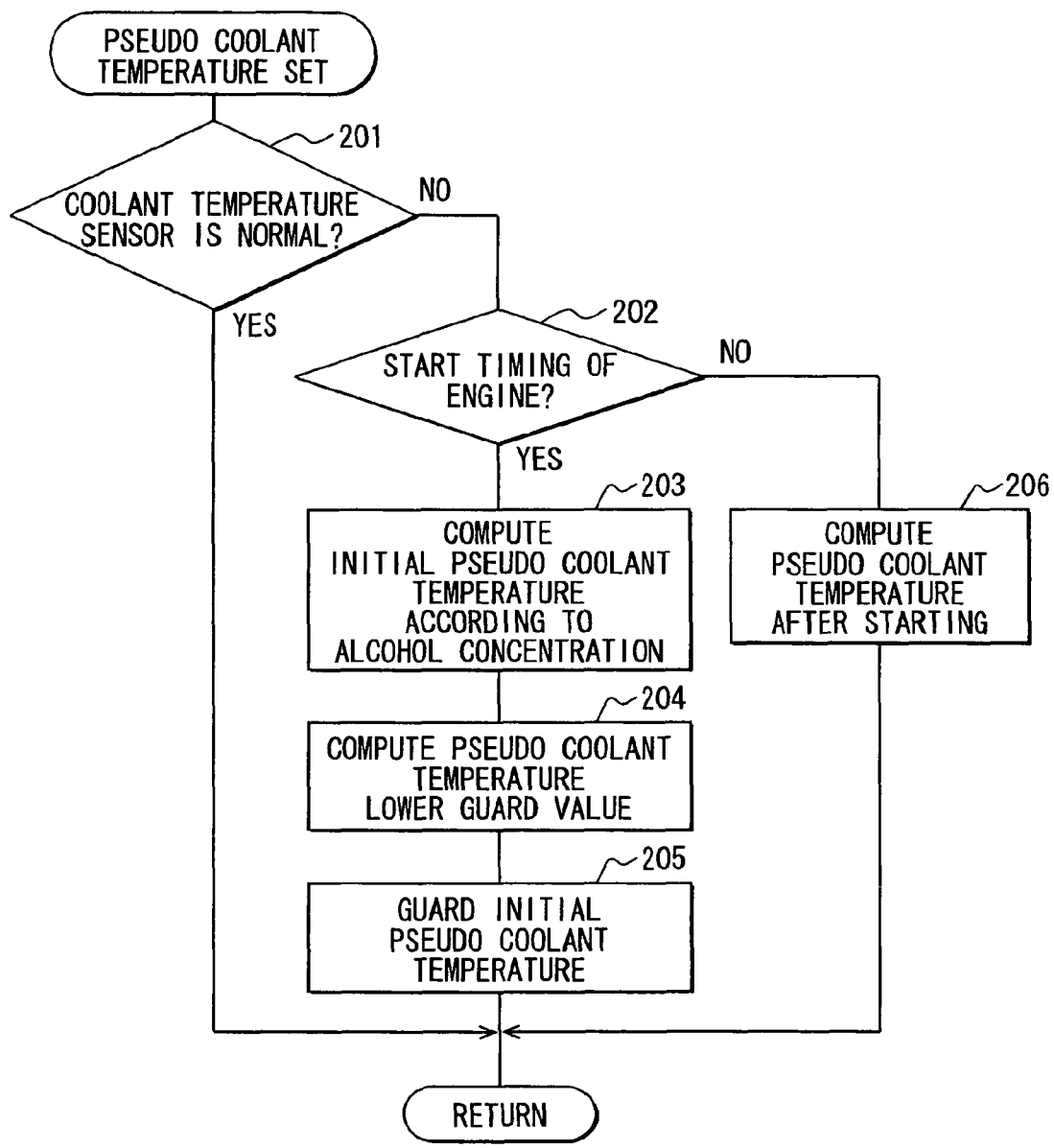
FIG. 14 is a flowchart showing a pseudo coolant temperature setting program according to the first embodiment.

The ECU 29 executes a pseudo coolant temperature setting program as shown in FIG. 14 in order to set the pseudo coolant temperature. When the coolant temperature 26 is abnormal at starting of engine, an initial pseudo coolant temperature is computed according to the alcohol concentration of the main fuel based on the initial pseudo coolant temperature map shown in FIG. 5. The initial pseudo coolant temperature map is made as follows. As shown by a solid line in FIG. 5, in a region where the alcohol concentration of the main fuel is less than or equal to a specified concentration, the pseudo coolant temperature is fixed at a standard coolant temperature (for example, 80° C.) for warming up of the engine. In a region where the alcohol concentration of the main fuel is greater than the specified concentration, the pseudo coolant temperature becomes lower than the standard coolant temperature. As the alcohol concentration becomes higher, the pseudo coolant temperature becomes lower.

Thereby, when the actual coolant temperature is in lower region and the alcohol concentration of the main fuel is in high region, that is, when the volatility of the main fuel is not ensured sufficiently, the warning increase coefficient is established by use of the pseudo coolant temperature which is lower than the standard coolant temperature.

Figure 5:
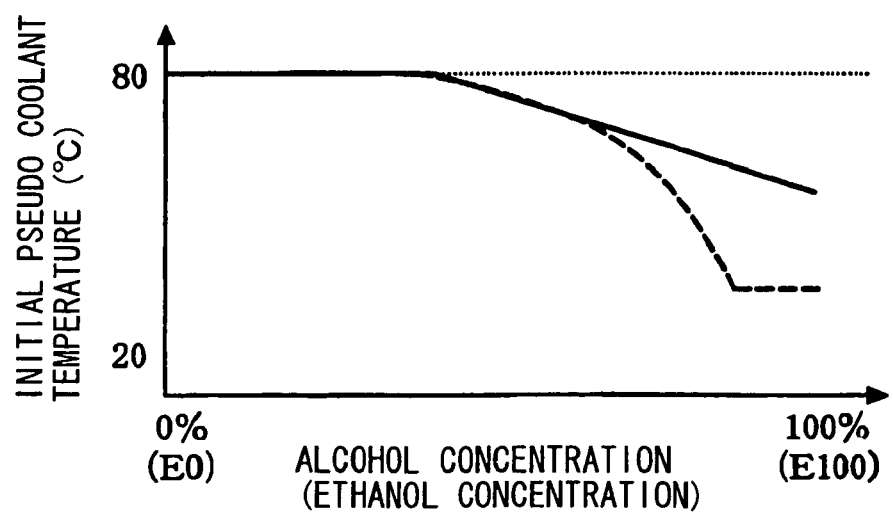
FIG. 5 is a chart conceptually showing a map of an initial pseudo coolant temperature.

As shown by a dashed line in FIG. 5, in a region where the alcohol concentration of the main fuel is greater than the specified concentration, as the alcohol concentration becomes higher, a decreasing degree of the pseudo coolant temperature becomes larger. Thereby, a decreasing degree of the pseudo coolant temperature is made large and an increasing correction amount of the main fuel injection quantity is increased.

Figure 6:
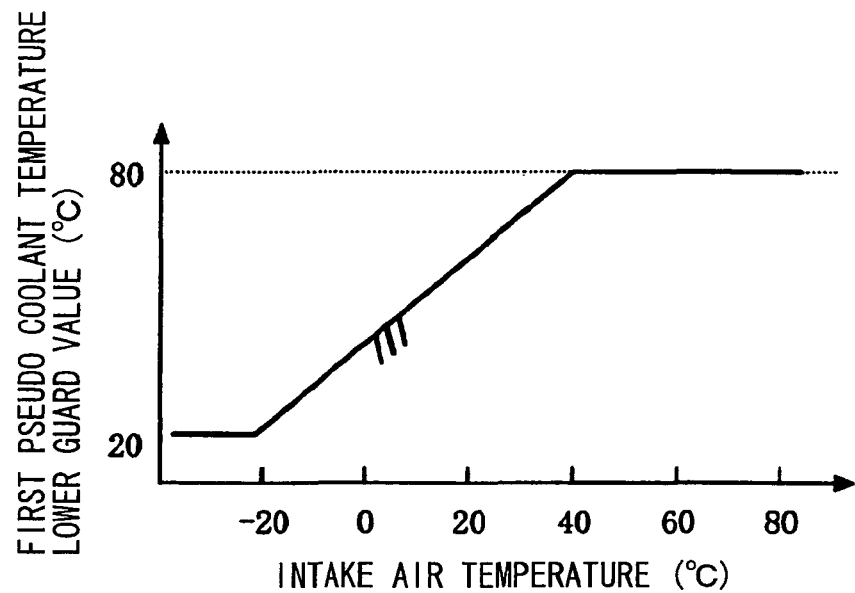
FIG. 6 is a chart conceptually showing a map of a first pseudo coolant temperature lower guard value.

Then, a first pseudo coolant temperature lower guard value is computed according to the intake air temperature based on a map of the first pseudo coolant temperature lower guard value shown in FIG. 6. The map of the first pseudo coolant temperature lower guard value is made based on a relationship between the intake air temperature and the coolant temperature. When the intake air temperature is lower than a specified lower value, the first pseudo coolant temperature lower guard value is fixed at a minimum value. When the intake air temperature is higher that the specified lower value and is lower than a specified higher value, the first pseudo coolant temperature lower guard value increases as the intake air temperature increases. When the intake air temperature is greater than the specified higher value, the first pseudo coolant temperature lower guard value is fixed at a maximum value.

Figure 7:
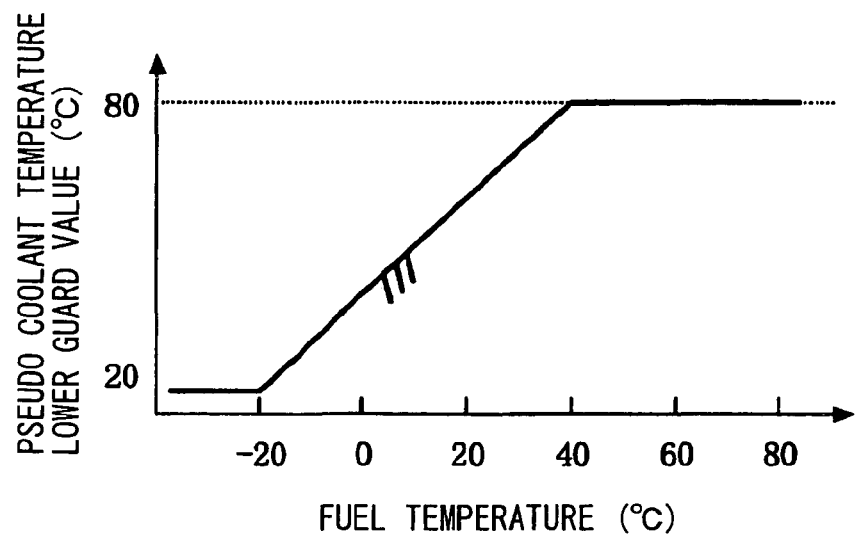
FIG. 7 is a chart conceptually showing a map of a first pseudo coolant temperature lower guard value.
Figure 8:
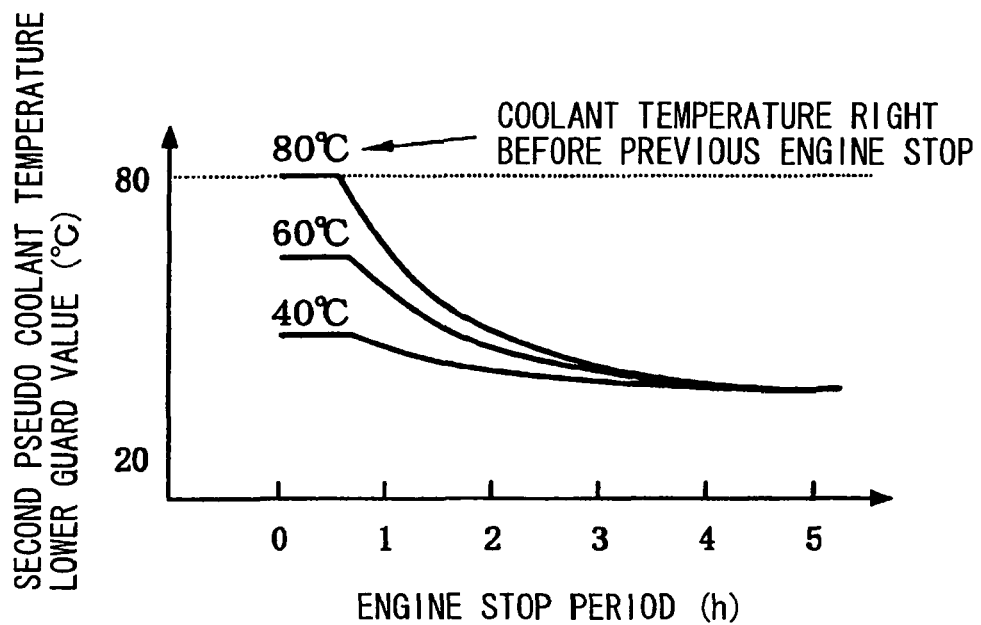
FIG. 8 is a chart conceptually showing a map of a second pseudo coolant temperature lower guard value.

Instead of the map shown in FIG. 6, referring to a map of the first pseudo coolant temperature lower guard value shown in FIG. 7, the first pseudo coolant temperature lower guard value may be computed according to the fuel temperature. Referring to a map of a second pseudo coolant temperature lower guard value shown in FIG. 8, a second pseudo coolant temperature lower guard value is computed according to a coolant temperature right before a previous engine stop and engine stop period (engine stop period from the previous engine stop to a current engine start). The map of a second pseudo coolant temperature lower guard value is established based on a relationship between the coolant temperature right before the previous engine stop, the engine stop period, and the coolant temperature at current engine start. As the coolant temperature right before previous engine stop decreases, the second pseudo coolant temperature lower guard value becomes lower. As the engine stop period becomes longer, the second pseudo coolant temperature lower guard value becomes lower.

The initial pseudo coolant temperature is guarded by the first pseudo coolant temperature lower guard value and the second pseudo coolant temperature lower guard value. The initial pseudo coolant temperature is corrected. Thereby, an error between actual coolant temperature and the pseudo coolant temperature is reduced. A setting accuracy of the pseudo coolant temperature is improved.

Figure 9:
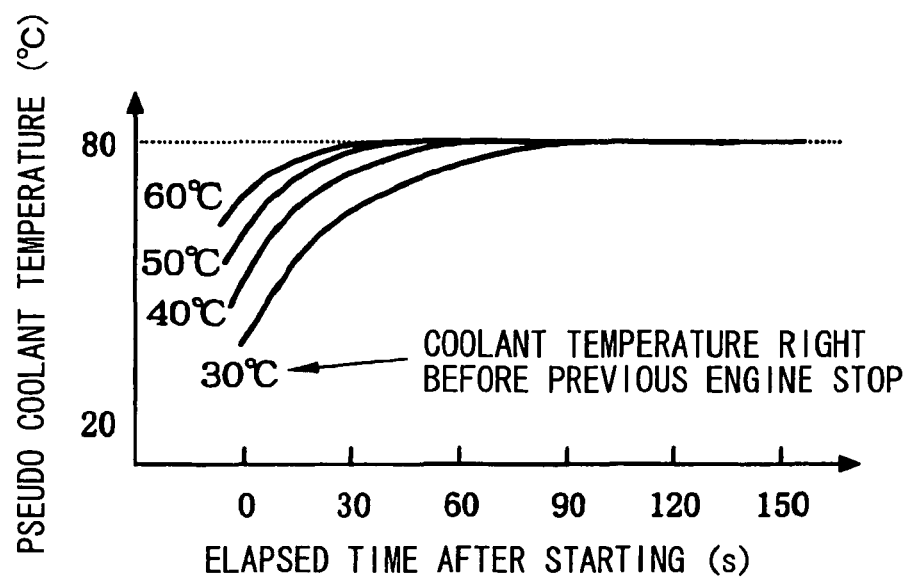
FIG. 9 is a chart conceptually showing a map of a pseudo coolant temperature after starting of engine.

After the initial pseudo coolant temperature is set, referring to a pseudo coolant temperature map shown in FIG. 9, the pseudo coolant temperature is computed according to the coolant temperature right before previous engine stop and an elapsed time after current engine start. This pseudo coolant temperature map is formed based on the coolant temperature right before previous engine stop and an elapsed time after current engine start. As the coolant temperature right before previous engine stop increases, the pseudo coolant temperature increases. As the elapsed time after current starting is prolonged, the pseudo coolant temperature is gradually increased to reach the standard coolant temperature (for example, 80° C.). Thus, the pseudo coolant temperature varies in a same manner as the actual coolant temperature. The setting accuracy of the pseudo coolant temperature is improved.

Figure 10:
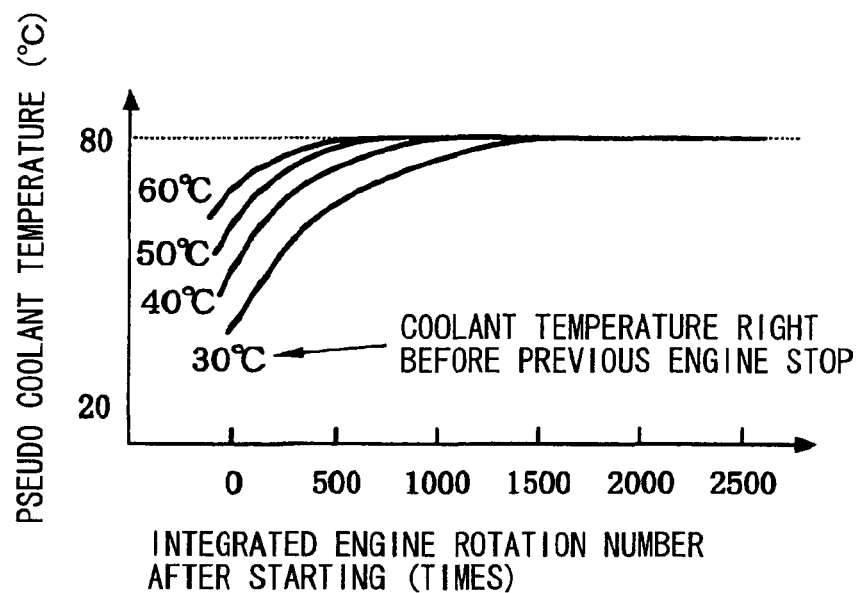
FIG. 10 is a chart conceptually showing a map of a pseudo coolant temperature after starting of engine.

Besides, instead of the map shown in FIG. 9, based on the pseudo coolant temperature map shown in FIG. 10, the pseudo coolant temperature can be computed according to the coolant temperature right before the previous engine stop and information of action quantity after current engine start (for example, one of integrated engine rotation numbers, integrated ignition times, and integrated travel distance)

Figure 11:
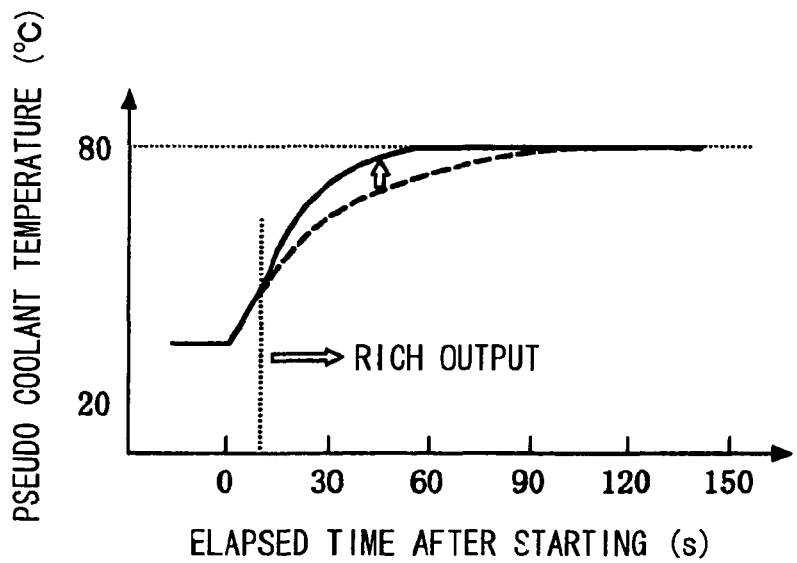
FIG. 11 is a chart conceptually showing another map of a pseudo coolant temperature after starting of engine.

As shown by solid line in FIG. 11, when the output of the exhaust gas sensor 24 becomes rich after starting of engine, the pseudo coolant temperature comes close to the standard coolant temperature. When the output of the exhaust gas sensor 24 becomes rich, it is determined that an engine temperature increases and volatility of the main fuel becomes high. Thus, when the output of the exhaust gas sensor 24 becomes rich, the actual coolant temperature increases faster. The pseudo coolant temperature comes close to the standard coolant temperature in high speed.

Figure 12:
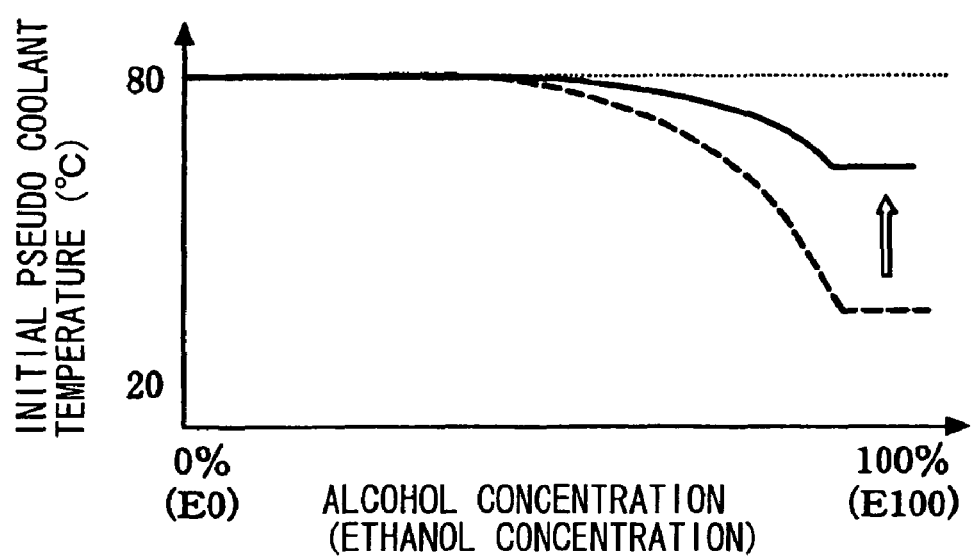
FIG. 12 is a chart conceptually showing a map of an initial pseudo coolant temperature.

As shown by a solid line in FIG. 12, when the coolant temperature sensor 26 becomes abnormal during an air-fuel ration feedback control, the pseudo coolant temperature may be set higher in a region where the alcohol concentration is higher than a specified concentration, or the initial pseudo coolant temperature may be set to the standard coolant temperature. The air-fuel ratio feedback control is started after the coolant temperature is increased. When the coolant temperature 26 becomes abnormal during the air-fuel ratio control, the initial pseudo coolant temperature is set to the standard coolant temperature or the initial pseudo coolant temperature is set higher value, so that the initial pseudo coolant temperature comes close to the actual coolant temperature. Thus, the setting accuracy of the initial pseudo coolant temperature can be improved.

Referring to FIG. 13, an auxiliary fuel supply control program will be described. Referring to FIG. 14, a pseudo coolant temperature set program will be described.

[Auxiliary Fuel Supply Control]

The auxiliary fuel supply control program is executed in a specified interval while the ECU 29 is ON. The auxiliary fuel supply control program functions as an auxiliary fuel supply control means. In step 101, the computer determines whether it is in a specified time period after starting. The specified period is a time or crank angle which is set according to at least one of coolant temperature, intake air temperature, and fuel temperature.

When the answer is Yes in step 101, the procedure proceeds to step 102 in which it is determined whether the coolant temperature sensor 26 is normal based on a diagnosis result of the coolant temperature sensor 26. When it is determined that the coolant temperature sensor 26 is normal, the procedure proceeds to step 103 in which the computer determines whether the coolant temperature detected by the coolant temperature sensor 26 is lower than or equal to a specified temperature (for example, 15° C.). In step 104, the computer determines whether the alcohol concentration is greater than or equal to a specified concentration (for example, 80%). Thereby, the computer determines whether the coolant temperature and the alcohol concentration of the main fuel are in the normal auxiliary fuel supply region (refer to FIG. 2).

When the computer determines that the coolant temperature and the alcohol concentration of the main fuel are in the normal auxiliary fuel supply region in step 103 and step 104, that is, when the coolant temperature is less than the specified temperature and the alcohol concentration of the main fuel is greater than the specified concentration, the procedure proceeds to step 108 in which the auxiliary fuel supply is conducted.

When the computer determines that the coolant temperature and the alcohol concentration of the main fuel are not in the normal auxiliary fuel supply region in step 103 and step 104, that is, when the coolant temperature is greater than the specified temperature or the alcohol concentration of the main fuel is less than the specified concentration, the computer determines that the main fuel has enough volatility. The procedure proceeds to step 109 in which no auxiliary fuel is supplied.

When it is determined that the coolant temperature sensor 26 is abnormal in step 102, the procedure proceeds to step 105 in which the pseudo coolant temperature is set to the standard coolant temperature (for example, 80° C.) and the pseudo coolant temperature is used as a substitute information of the coolant temperature. When the warming increase coefficient of the main fuel injection quantity is computed, the pseudo coolant temperature which is set by the pseudo coolant temperature set program shown in FIG. 14 is used as substitute information of the coolant temperature.

Then, the procedure proceeds to step 106 in which the computer determines whether the engine is inoperative according to the engine speed. When the answer is Yes, the procedure proceeds to step 107 in which the computer determines whether the alcohol concentration of the main fuel is greater than or equal to the auxiliary fuel supply determination value (for example, 70%). Thereby, it is determined whether the alcohol concentration of the main fuel is in the auxiliary fuel supply region for abnormal coolant temperature sensor (refer to FIG. 2).

When it is determined that the engine is inoperative in step 106 and when the alcohol concentration of the main fuel is in the auxiliary fuel supply region for abnormal coolant temperature sensor in step 107, that is, when the alcohol concentration of the main fuel is greater than the auxiliary fuel supply determination value, the computer determines that the main fuel has not enough volatility. The procedure proceeds to step 108 in which the auxiliary fuel supply is conducted.

When it is determined that the engine is not inoperative in step 106 or when the alcohol concentration of the main fuel is not in the auxiliary fuel supply region for abnormal coolant temperature sensor, the computer determines that main fuel has enough volatility. The procedure proceeds to step 110 in which no auxiliary fuel is supplied. Thus, when the engine 11 can be started, even if the alcohol concentration of the main fuel is greater than the auxiliary fuel supply determination value, no auxiliary fuel is supplied.

[Pseudo Coolant Temperature Set Program]

A pseudo coolant temperature set program shown in FIG. 14 is executed at a specified period while the ECU 29 is ON. This program corresponds to a pseudo coolant temperature set means. In step 201, it is determined whether the coolant temperature sensor 26 is normal based on a diagnosis result thereof. When it is determined that the coolant temperature sensor 26 is normal, this program ends without performing subsequent steps.

When it is determined that the coolant temperature sensor 26 is abnormal in step 201, the procedure proceeds to step 202. In step 202, the computer determines whether it is a start timing of the engine. When the answer is Yes in step 202, the procedure proceeds to step 203 in which an initial pseudo coolant temperature value is computed based on the map shown in FIG. 5. When the alcohol concentration of the main fuel is higher than a specified concentration, the pseudo coolant temperature is set smaller than the standard coolant temperature.

Then, the procedure proceeds to step 204 in which a first pseudo coolant temperature lower guard value is computed based on the map shown in FIG. 6 (or FIG. 7). Further, a second pseudo coolant temperature lower guard value is computed based on the map shown in FIG. 8.

Then, the procedure proceeds to step 205 in which the initial pseudo coolant temperature is guarded by the first pseudo coolant temperature lower guard value and the second pseudo coolant temperature lower guard value. The initial pseudo coolant temperature is corrected so that an error between the actual coolant temperature and the initial pseudo coolant temperature value is reduced.

When the answer is No in step 202, the procedure proceeds step 206 in which the pseudo coolant temperature is computed based on a map shown in FIG. 9 (or FIG. 10). The pseudo coolant temperature is based on the coolant temperature right before the previous engine stop and the elapsed time after the current engine start. The pseudo coolant temperature is gradually increased to come close to the standard coolant temperature.

As shown in a solid line in FIG. 11, when the output of the exhaust gas sensor 24 becomes rich, the pseudo coolant temperature may come close to the standard coolant temperature in a short period.

As shown in a solid line in FIG. 12, when the coolant temperature sensor 26 becomes abnormal during an air-fuel feedback control, the pseudo coolant temperature is set higher than a dashed line or the initial pseudo coolant temperature value is set to the standard coolant temperature.

According to the first embodiment, when the coolant temperature sensor 26 is abnormal and the alcohol concentration of the main fuel is greater than the auxiliary fuel supply determination value, the auxiliary fuel is supplied, whereby the auxiliary fuel supply is conducted in all temperature range of the coolant temperature. Thus, when the actual coolant temperature is in low temperature region and the alcohol concentration is in high concentration region, the auxiliary fuel supply is executed. The startability and drivability can be improved. When the alcohol concentration is lower than the auxiliary fuel supply determination value, it is determined that the volatility of the main fuel is enough. The auxiliary fuel supply is not conducted, so that excess use of the auxiliary fuel can be restricted.

Furthermore, in a case that the coolant temperature sensor 26 is abnormal, when the engine 11 is inoperative and alcohol concentration is greater than the auxiliary fuel supply determination value, the auxiliary fuel supply is conducted. When the engine is operative, it is determined that the volatility of the main fuel is sufficient and the auxiliary fuel is not supplied, the consumed quantity of the auxiliary fuel can be reduced.

According to the first embodiment, when the coolant temperature 26 is abnormal, the pseudo coolant temperature that is lower than the standard coolant temperature is established. This pseudo coolant temperature is used as substitute information of the coolant temperature. By use of this substitute information of the coolant temperature, the warming increase coefficient is computed. Thereby, when the coolant temperature is in low temperature region and the alcohol concentration of the main fuel is in high concentration region, since the warming increase coefficient is computed based on the pseudo coolant temperature which is lower than the standard coolant temperature, the fuel injection quantity of the main fuel is sufficiently increased. The startability and the drivability can be improved.

According to the first embodiment, as the elapsed time after starting engine is prolonged, the pseudo coolant temperature is gradually increased to come close to the standard coolant temperature. Thus, the pseudo coolant temperature can be varied in the same manner as the actual coolant temperature. The accuracy of the pseudo coolant temperature and warming increase coefficient can be improved.

Second Embodiment

Referring to FIGS. 15 to 18, a second embodiment will be described.

In the first embodiment, the auxiliary fuel supply determination value is fixed value. According to the second embodiment, by executing an auxiliary fuel supply control program shown in FIG. 15, the auxiliary fuel supply determination value E is varied according to an intake air temperature.

Figure 15:
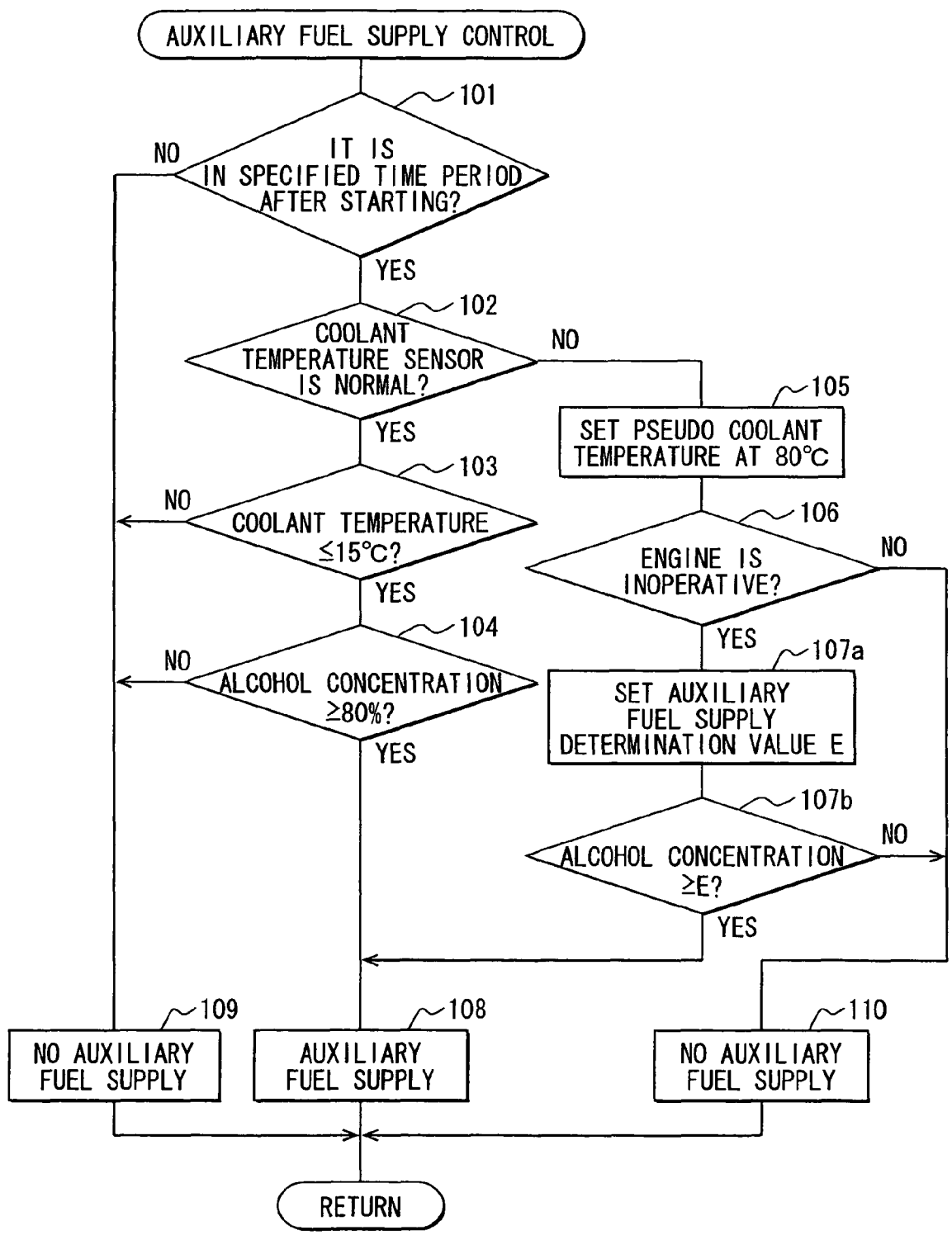
FIG. 15 is a flowchart showing an auxiliary fuel supply control program according to a second embodiment.

In the auxiliary fuel supply control program shown in FIG. 15, the computer determines whether the coolant temperature sensor 26 is normal in a specified period from starting of engine (steps 101, 102). When the coolant temperature sensor 26 is normal, the computer determines whether the coolant temperature is less than or equal to a specified temperature (for example, 15° C.) and determines whether the alcohol concentration of the main fuel is greater than or equal to a specified concentration (for example, 80%). Thereby, the computer determines whether the coolant temperature and the alcohol concentration in the normal auxiliary fuel supply region (refer to FIG. 17) (steps 103, 104).

As the result, when it is determined that the coolant temperature and alcohol concentration of the main fuel are in the normal auxiliary fuel supply region, the auxiliary fuel of which volatility is higher than the main fuel is supplied (step 108). When it is determined that the coolant temperature and alcohol concentration of the main fuel are not in the normal auxiliary fuel supply region, the auxiliary fuel is not supplied.

When the coolant temperature sensor 26 is abnormal, the pseudo coolant temperature is set to the standard coolant temperature (for example 80° C.), and then it is determined whether the engine is inoperative (steps 105, 106). When it is determined that the engine 11 is inoperative, the procedure proceeds to step 107a in which the auxiliary fuel supply determination value E is computed according to the intake air temperature based on a table shown in FIG. 16.

Generally, as the engine temperature increases, the intake air temperature increases. As the engine temperature increases, the volatility of the main fuel becomes high. The alcohol concentration is increased, whereby the auxiliary fuel supply is necessary. In the table of the auxiliary fuel supply determination value E shown in FIG. 16, as the intake air temperature increases, the auxiliary fuel supply determination value E is made larger, so that alcohol concentration of the main fuel is increased. Besides, when the intake temperature is greater than a specified value (for example, 30° C.), the auxiliary fuel supply determination value E is set to a value larger than 100% (for example, 110%), so that the auxiliary fuel is not supplied.

Figures 16, 17:
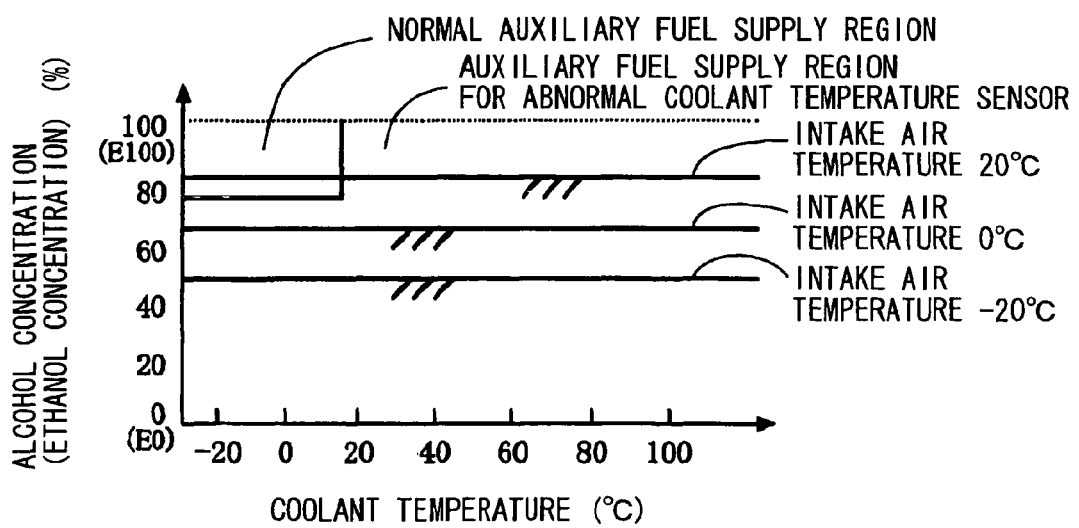
FIG. 16 is a chart conceptually showing a table of an auxiliary fuel supply determination value according to the second embodiment.
FIG. 17 is a chart showing an auxiliary fuel supply region according to the second embodiment.

Then, the procedure proceeds to step 107b in which it is determined whether the alcohol concentration of the main fuel is greater than or equal to the auxiliary fuel supply determination value E, whereby it is determined whether the alcohol concentration is in the auxiliary fuel supply region for an abnormal coolant temperature (refer to FIG. 17).

When it is determined that the engine is inoperative in step 106 and when it is determined that the alcohol concentration of the main fuel is in the auxiliary fuel supply region for an abnormal coolant temperature in step 107b, the auxiliary fuel is supplied (step 108). When the answer is No in step 106 or when the answer is No in step 107b, the auxiliary fuel is not supplied (step 110).

According to the second embodiment, the auxiliary fuel supply determination value E is varied according to the intake air temperature. Thus, the auxiliary fuel supply determination value E can be varied to a suitable value when the alcohol concentration of the main fuel is varied. An excess auxiliary fuel supply can be restricted.

Figures 18, 19:
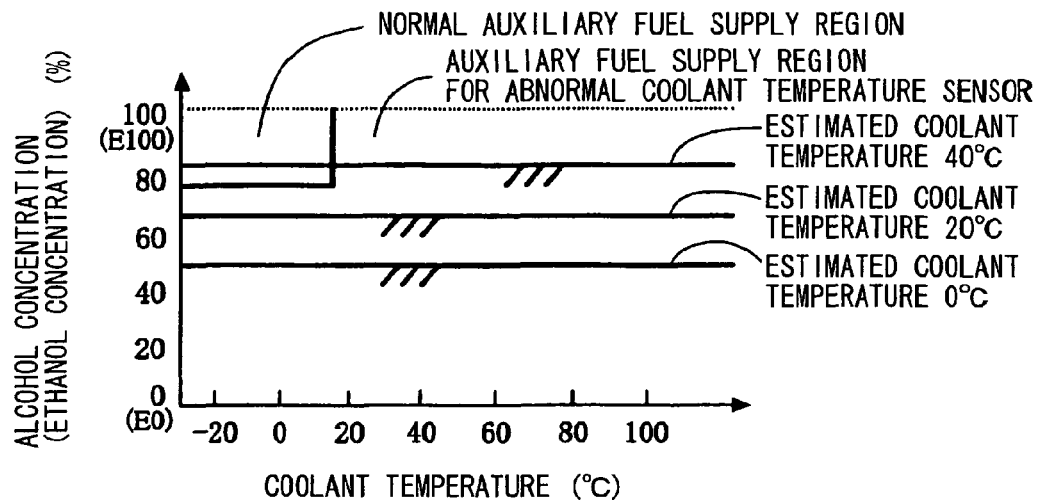
FIG. 18 is a chart showing an auxiliary fuel supply region according to a modification of the second embodiment.
FIG. 19 is a chart conceptually showing a two-dimensional map of the initial pseudo coolant temperature according to another embodiment.

In the above second embodiment, the auxiliary fuel supply determination value E is varied according to the intake air temperature. Alternatively, the auxiliary fuel supply determination value E is varied according to the fuel temperature. Besides, as shown in FIG. 18, based on coolant temperature right before previous engine stop and an engine stop period, an estimated coolant temperature is computed. As the estimated coolant temperature increases, the auxiliary fuel supply determination value E becomes large and the alcohol concentration of the main fuel is increased. In a region where the estimated coolant temperature is higher than a specified value (for example, 60° C.), the auxiliary fuel supply determination value E is set to a value larger than 100% (for example 110%). Thereby, the auxiliary fuel supply is not conducted.

When the alcohol concentration of the main fuel is varied, the auxiliary fuel supply determination value E can be correctly changed.

Other Embodiment

In the above first and second embodiments, the initial pseudo coolant temperature is computed according to the alcohol concentration of the main fuel. The pseudo coolant temperature lower guard value is computed and the initial pseudo coolant temperature is corrected. In other embodiment, based on a two-dimensional map of the initial pseudo coolant temperature shown in FIG. 19, the initial pseudo coolant temperature may be computed according to the alcohol concentration of the main fuel and the intake air temperature. Alternatively, the initial pseudo coolant temperature may be computed based on the alcohol concentration and the fuel temperature.

In the first and second embodiment, in a case that the coolant temperature sensor 26 is abnormal, only when the engine is inoperative and alcohol concentration of the main fuel is greater than or equal to the auxiliary fuel supply determination value, the auxiliary fuel is supplied. Alternatively, a process for determining whether engine 11 is inoperative can be omitted. In a case that the coolant temperature sensor 26 is abnormal, when the alcohol concentration of the main fuel is greater than or equal to the auxiliary fuel supply determination value, the auxiliary fuel is supplied.

In the first and second embodiments, the alcohol concentration of the main fuel is detected by the alcohol concentration sensor 37. In a system where no alcohol concentration sensor is provided, the alcohol concentration can be estimated based on the air-fuel ratio feedback correction value.

In the first and second embodiments, in a case that the coolant temperature sensor is abnormal, when the alcohol concentration of the main fuel is greater than or equal to the auxiliary fuel supply determination value, the auxiliary fuel is supplied. And in a case that the coolant temperature sensor is abnormal, when the alcohol concentration of the main fuel is high, the pseudo coolant temperature is established. The fuel injection quantity of the main fuel is increased based on the pseudo coolant temperature. One of the above technologies can be conducted.

A technology in which the fuel injection quantity of the main fuel is increased by use of the pseudo coolant temperature can be applied to a system having not auxiliary fuel supply apparatus.

The invention claimed is:

1. A controller for an internal combustion engine applied to a system in which a main fuel including alcohol and an auxiliary fuel of which volatility is higher than the main fuel can be supplied, the controller comprising:
   an alcohol concentration obtaining means for detecting or estimating the alcohol concentration of the main fuel;
   a coolant temperature sensor detecting a coolant temperature of the internal combustion engine; and
   an auxiliary fuel supply control means having a program, which when executed causes the fuel supply control means to control an auxiliary fuel supply based on the coolant temperature detected by the coolant temperature sensor and alcohol concentration of the main fuel detected or estimated by the alcohol concentration obtaining means; wherein
   in a case that the coolant temperature sensor is abnormal, the auxiliary fuel supply control means conducts the auxiliary fuel supply when the alcohol concentration of the main fuel detected or estimated by the alcohol concentration obtaining means is greater than or equal to an auxiliary fuel supply determination value.

2. A controller for an internal combustion engine according to claim 1, wherein
   the auxiliary fuel supply control means conducts the auxiliary fuel supply when the internal combustion engine is inoperative and the alcohol concentration of the main fuel detected or estimated by the alcohol concentration obtaining means is greater than or equal to the auxiliary fuel supply determination value in a case that the coolant temperature sensor is abnormal.

3. A controller for an internal combustion engine according to claim 1, wherein
   the auxiliary fuel supply control means varies the auxiliary fuel supply determination value according to at least one of an intake temperature and a fuel temperature.

4. A controller for an internal combustion engine according to claim 1, wherein
   the auxiliary fuel supply control means varies the auxiliary fuel supply determination value according to a coolant temperature right before previous engine stop and an engine stop period from a previous stop to current start.

5. A controller for an internal combustion engine applied to a system in which a main fuel including alcohol can be supplied, the controller comprising:
   an alcohol concentration obtaining means for detecting or estimating the alcohol concentration of the main fuel;
   a coolant temperature sensor detecting a coolant temperature of the internal combustion engine;
   a fuel injection control means for controlling a main fuel injection quantity based on the coolant temperature and the alcohol concentration; and
   a pseudo coolant temperature setting means for setting a pseudo coolant temperature which is lower than a standard coolant temperature in a case that the coolant temperature sensor is abnormal, wherein
   the pseudo coolant temperature setting means sets the pseudo coolant temperature in a manner that the pseudo coolant temperature decreases as the alcohol concentration becomes high,
   the fuel injection control means controls the fuel injection quantity of the main fuel by use of pseudo coolant temperature instead of the coolant temperature detected by the coolant temperature sensor in a case that the coolant temperature sensor is abnormal.

6. A controller for an internal combustion engine according to claim 5, wherein
   the pseudo coolant temperature setting means corrects the pseudo coolant temperature according to at least one of an intake air temperature and a fuel temperature.

7. A controller for an internal combustion engine according to claim 5, wherein the pseudo coolant temperature setting means corrects the pseudo coolant temperature according to a coolant temperature right before previous engine stop and an engine stop period from a previous stop to current start.

8. A controller for an internal combustion engine according to claim 5, wherein
   the pseudo coolant temperature setting means sets the pseudo coolant temperature in a manner that the pseudo coolant temperature comes close to a standard coolant temperature as an elapsed time or an operation amount after starting of the engine increases.

9. A controller for an internal combustion engine according to claim 8, further comprising an exhaust gas sensor detecting an air-fuel ratio or rich/lean of an exhaust gas, wherein
   the pseudo coolant temperature setting means makes the pseudo coolant temperature close to the standard coolant temperature in a high speed when the output of the exhaust gas sensor becomes rich.

10. A controller for an internal combustion engine applied to a system in which a main fuel including alcohol can be supplied, the controller comprising:

an alcohol concentration obtaining means for detecting or estimating the alcohol concentration of the main fuel;

a coolant temperature sensor detecting a coolant temperature of the internal combustion engine;

a fuel injection control means for controlling a main fuel injection quantity based on the coolant temperature and the alcohol concentration; and a pseudo coolant temperature setting means for setting a pseudo coolant temperature which is lower than a standard coolant temperature in a case that the coolant temperature sensor is abnormal during an initial setting, and an exhaust gas sensor detecting an air-fuel ratio or rich/lean of the exhaust gas, wherein the fuel injection control means controls the fuel injection quantity of the main fuel by use of pseudo coolant temperature instead of the coolant temperature detected by the coolant temperature sensor in a case that the coolant temperature sensor is abnormal, the fuel injection control means executes an air-fuel ratio feedback control in which a fuel injection quantity of the main fuel is feedback controlled based on an output of the exhaust gas sensor, and the pseudo coolant temperature setting means sets the pseudo coolant temperature to a standard coolant temperature or high temperature side when the coolant temperature sensor becomes abnormal during the air-fuel ratio feedback control.

* * * * *

UNITED STATES PATENT AND TRADEMARK OFFICE
CERTIFICATE OF CORRECTION

| | | |
|---|---|---|
| PATENT NO. | : 8,200,412 B2 | |
| APPLICATION NO. | : 12/449485 | |
| DATED | : June 12, 2012 | |
| INVENTOR(S) | : Kenji Nagasaki et al. | |

It is certified that error appears in the above-identified patent and that said Letters Patent is hereby corrected as shown below:

On the Title Page, Item (63) Line 30, please delete the Foreign Application Priority Data "Apr. 4, 2006 (JP) ..............2006-103119"

Signed and Sealed this
Twenty-eighth Day of August, 2012

David J. Kappos
*Director of the United States Patent and Trademark Office*